United States Patent [19]
Nishikawa

[11] Patent Number: 6,014,065
[45] Date of Patent: Jan. 11, 2000

[54] MULTI-PHASE MODULATOR HAVING AUTOMATIC COMPENSATORS FOR OFFSETS OF ORTHOGONAL ADJUSTMENT

[75] Inventor: Makoto Nishikawa, Tokyo, Japan

[73] Assignee: NEC Corporation, Tokyo, Japan

[21] Appl. No.: 09/040,449

[22] Filed: Mar. 18, 1998

[30] Foreign Application Priority Data

Mar. 21, 1997 [JP] Japan ..................................... 9-067684

[51] Int. Cl.[7] .................................................. H04L 27/20
[52] U.S. Cl. .......................... 332/103; 375/280; 375/296; 375/308
[58] Field of Search ..................................... 332/103, 104, 332/105; 375/279, 280, 281, 283, 308, 296

[56] References Cited

U.S. PATENT DOCUMENTS 5,355,101  10/1994  Ichihara et al. .......................... 332/103
5,371,481  12/1994  Tittanen et al. .......................... 332/103
5,663,691  9/1997  Kowalik et al. .......................... 332/103

*Primary Examiner*—Siegfried H. Grimm
*Attorney, Agent, or Firm*—Young & Thompson

[57] ABSTRACT

A multi-phase modulator for modulating n digital data into a $2^n$ digital phase modulated signal includes digital-analog convertors for converting the digital data into analog signals, automatic gain compensators for controlling output levels of the analog signals, binary phase modulators for modulating the analog signals, a 90-degree phase shifter operatively connected to the binary phase modulators for providing modulated signals, the modulated signals being phase shifted from one another by 90-degrees, and offset compensators for compensating and adjusting offsets of orthogonal adjustment by automatic control, the offset compensators including DC offset compensators for controlling DC voltages of the digital-analog convertors, gain offset compensators for controlling gains of the automatic gain compensators, and a phase offset compensator for controlling phases of the modulated signals provided by the 90-degree phase shifter and input to the binary phase modulators.

12 Claims, 7 Drawing Sheets

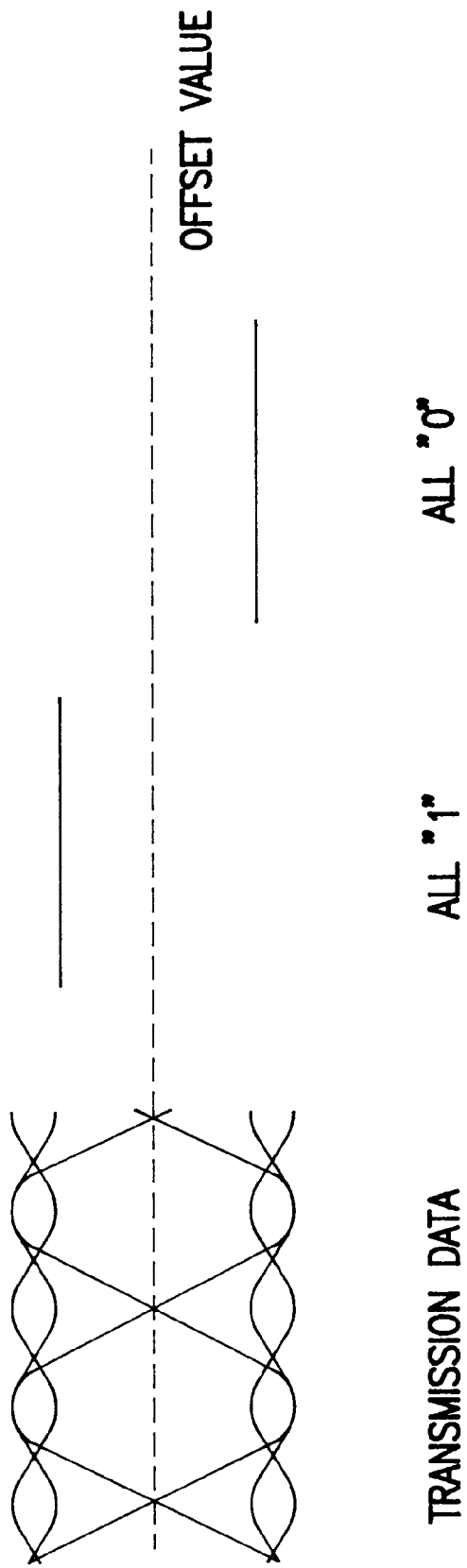

MULTI-PHASE MODULATOR HAVING AUTOMATIC COMPENSATORS FOR OFFSETS OF ORTHOGONAL ADJUSTMENT

BACKGROUND OF THE INVENTION

1. Field of the Invention

The present invention relates to a multi-phase modulator, and more particularly to a multi-phase modulator which modulates digital orthogonal data and has automatic compensators for offsets of orthogonal adjustment.

2. Description of the Related Art

An exemplary QPSK (quadrature phase shift keying) modulator will be described below with reference to FIG. 8 showing prior art. Data Q 201 and data I 202 for transmission data are re-timed by a timing signal 205 in retiming circuits (RE-TIME) 1 and 2 respectively. Output signals 101 and 102 from the RE-TIMEs 1 and 2 are set to all "1" or all "0" by a modulation/no-modulation switching signal (MOD/NO MOD) 203 during a no-modulation period.

Bandwidths of the output signals 101 and 102 are limited by bandpass filters (digital filters) (BPF) 3 and 4 respectively. Outputs of the BPF 3 and 4 are converted into analog voltage signals 105 and 106 by digital/analog converters (D/A CONV) 5 and 6 respectively. Sampling signals contained in outputs 105 and 106 from the D/A CONVs 5 and 6 are removed by low-pass filter circuits (LPF) 7 and 8. As a result, output signals 107 and 108 from the LPFs 7 and 8 are obtained. Then, the output signals 107 and 108 are differentiated with reference voltages V9 and V10 and amplified by differential amplifiers (DIFF AMP) 9 and 10. Then, output signals 109 and 110 of the DIFF AMPs 9 and 10 are sent to inputs of binary phase-shift-keying modulators (BPSK MOD) 11 and 12.

A local frequency signal (LO FREQ) 204 is divided into signals 113 and 113' having a phase difference of 90 degrees from each other by a 90-degree phase shifter ($\pi/2$ PHASE SHIFTER) 13. The transmission signals 111 and 112 are 0-$\pi$ phase-modulated respectively by the BPSK MODs 11 and 12. Then the resulting signal 114 combined by a combiner (COMB) 14 is a QPSK-modulated signal.

Under this situation, the reference voltages V9 and V10 are adjusted and set so that a signal-state space diagram of the QPSK-modulated signal is as shown in FIG. 5. In the signal-state space diagram, all signal-states have equal amplitudes and are evenly distributed (90-degrees spaced) on a circle.

The conventional modulator shown in FIG. 8 has a disadvantage in that it causes offsets of orthogonal characteristics after the completion of the adjustment of amplitude and phase characteristics due to external factors such as the offset change and the gain change of the DIFF AMPs 9 and 10, the phase offset of the $\pi/2$ PHASE SHIFTER 13, and temperature change. These offsets degrade modulation characteristics and generate some problems of a high bit error rate, a phase ambiguity and so on in a receive side.

SUMMARY OF THE INVENTION

Therefore, it is an object of the present invention to provide a multi-phase modulator which can automatically compensate and adjust any offsets of phase, amplitude and orthogonal characteristics that occur during an operation of the modulator after an initial adjustment.

The present invention provides the multi-phase modulator including a bandwidth limiting means for limiting the bandwidth of a first and second data signal strings respectively, an analog converting means for converting each resulting signal string into an analog signal after such bandwidth limitation, a low-pass filter means for receiving each resulting analog signal, a differential amplifying means for setting the amplitude and the offset of each output from such low-pass filter means, a phase shifting means for generating a pair of carrier signals having a 90-degree phase difference by shifting the phase of a carrier by 90 degrees, and a phase modulating means for phase-modulating each output of said differential amplifying means with each of a pair of said carrier signals respectively, comprising an integrating means for integrating each output of said differential amplifying means, which is a phase modulator containing a phase modulating means for phase-modulating each output of said differential amplifying means with each of a pair of said carrier signals respectively; an offset voltage controlling means for controlling the offset voltage of said differential amplifying means according to a value obtained by adding a signal according to each such integration output to a first temperature compensating signal; an integrating means for integrating each input of said phase modulating means; an amplitude controlling means for controlling the amplitude of the output of said differential amplifying means according to a value obtained by adding a signal according to each such integration output to a second temperature compensating signal; a multiplying means for multiplying one of a pair of said carrier signals by the other; a means for generating a voltage according to the frequency of said carrier; and a phase shift controlling means for controlling the phase shift of said phase means according to such voltage, the output of said multiplying means and a third temperature compensating signal.

The operation of the present invention will be described below. To adjust the offset voltage of the differential amplifier which differentiates and amplifies an analog signal obtained by D/A converting the data signal string and limiting its bandwidth, the differential amplification output is integrated, the first temperature compensating signal is added to a voltage according to such integration output, and the offset voltage of the differential amplifier according to the resulting output obtained by such addition.

The input of the phase modulating circuit is rectified and integrated. The second temperature compensating signal is added to a voltage according to such integrated output. The input amplitude of the phase modulating circuit is controlled according to the output obtained by such addition. Furthermore, one of a pair of the carrier signals having a 90-degree phase difference is multiplied by the other. A phase error of two signals is detected based on an output obtained by such multiplication. The phase shift of a carrier frequency shifter is controlled according to said phase error, a voltage according to the carrier frequency and the third temperature compensating signal. By so doing, the shift due to temperature change of the following factors is automatically compensated: the offset voltage of the differential amplifier, the input amplitude of the phase modulating circuit and the shift of carrier phase shifter.

BRIEF DESCRIPTION OF THE DRAWINGS

FIG. 6A is a diagram showing an example of a transmission data waveform in case of random transmission data.

FIG. 6B is a diagram showing an example of a transmission data waveform in case of fixed transmission data of all "1".

FIG. 6C is a diagram showing an example of a transmission data waveform in case of fixed transmission data of all "0".

DETAILED DESCRIPTION OF PREFERRED EMBODIMENTS OF THE INVENTION

Several embodiments of the present invention will be described below with reference to the accompanying drawings.

Figure 1:
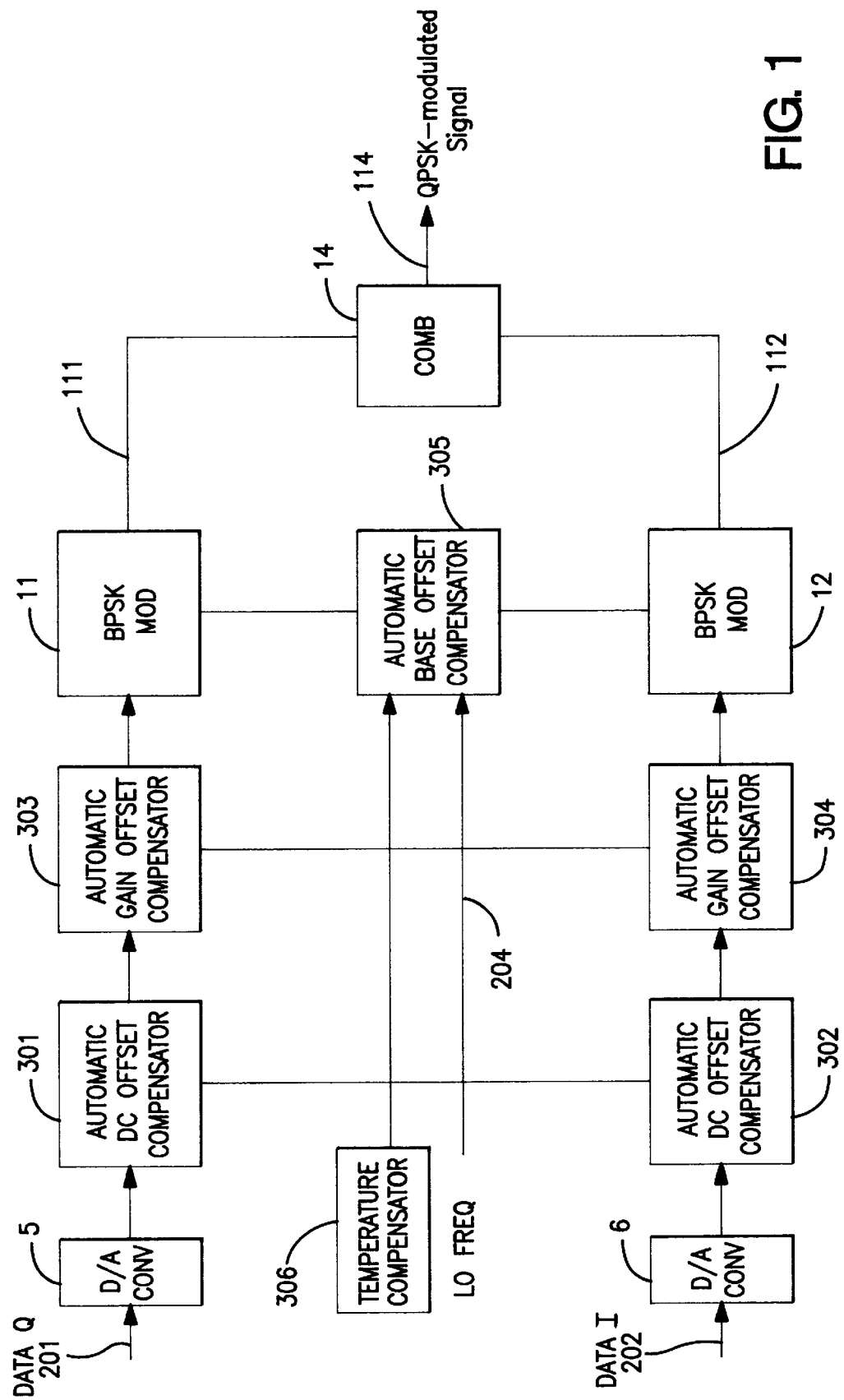
FIG. 1 is a block diagram of one embodiment (QPSK modulator) of the present invention.

FIG. 1 is a block diagram of a first embodiment (QPSK modulator) according to the present invention.

In FIG. 1, data Q 201 and data I 202 for transmission data signal are converted to analog signals in the D/A CONV 5 and 6 and then outputs from the D/A CONV 5 and 6 are applied to automatic DC offset compensators 301 and 302 respectively. DC offset voltages of the DIFF AMPs contained in the automatic DC offset compensators 301 and 302 are adjusted and compensated automatically by the automatic DC offset compensators 301 and 302.

Outputs of the automatic DC offset compensators 301 and 302 are applied to the automatic GAIN offset compensators 303 and 304. Gain offsets of the DIFF AMPs contained in the automatic DC offset compensators 301 and 302 are adjusted and compensated automatically by the automatic GAIN offset compensators 303 and 304. Outputs of the automatic GAIN offset compensators 303 and 304 are sent to the BPSK MODs 11 and 12 respectively.

A local frequency signal (LO FREQ) 204 is applied to an automatic PHASE offset compensator 305. A phase offset of the π/2 phase shifter in the automatic PHASE offset compensator 305 is adjusted and compensated automatically by the automatic PHASE offset compensator 305.

A temperature offset of the automatic DC offset compensators 301 and 302, the automatic GAIN offset compensators 303 and 304, and the automatic PHASE offset compensator 305 are controlled and adjusted by a temperature compensator 306.

Output signals 111 and 112 from the BPSK MODs 11 and 12 are combined by the combiner (COMB) 14 and the QPSK-modulated signal is obtained by the combined output signal 114.

More concrete explanation is described with reference to FIG. 2 as below.

Figure 2:
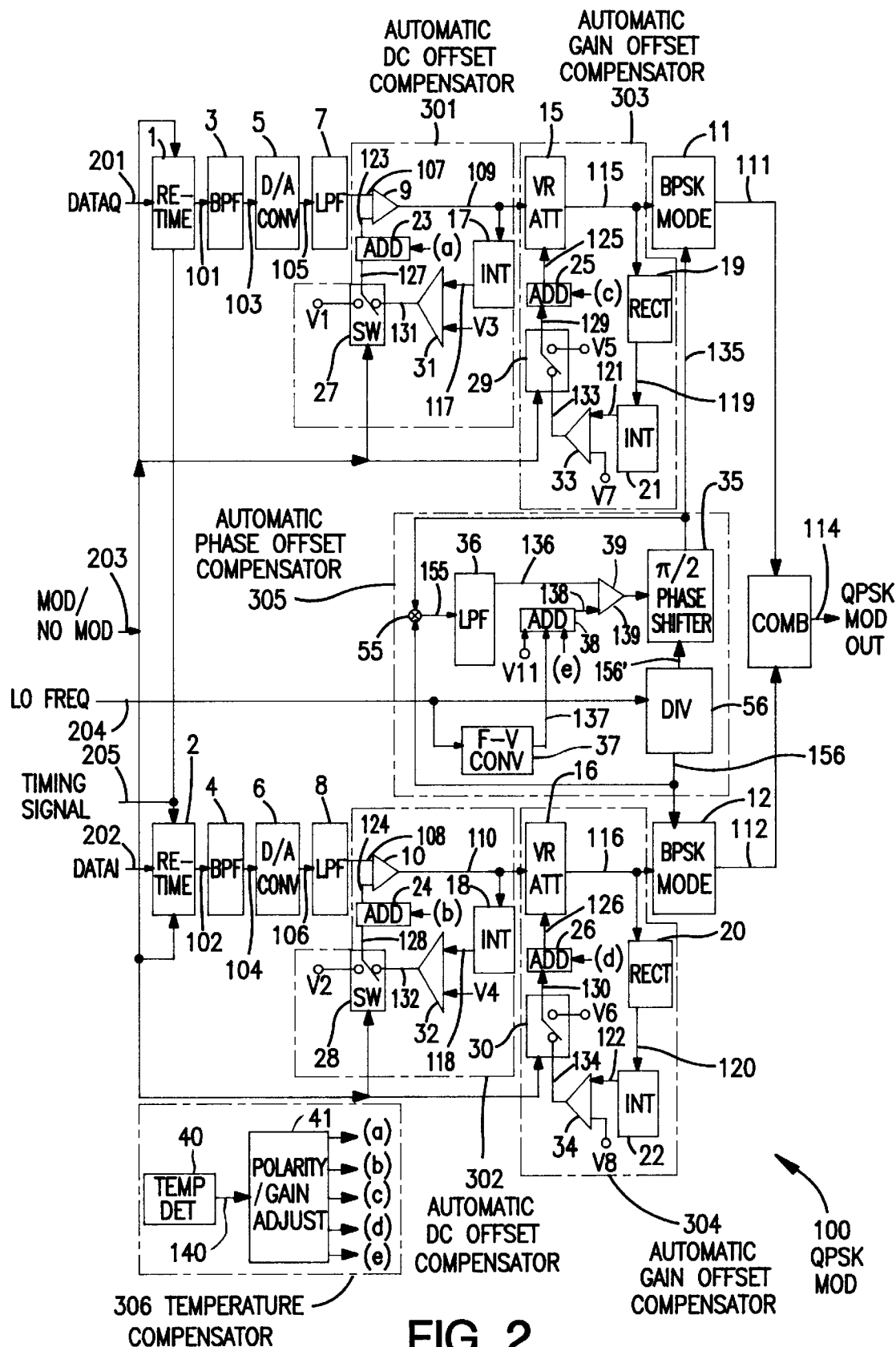
FIG. 2 is a more detailed block diagram of the block diagram shown in FIG. 1.
Figure 5:
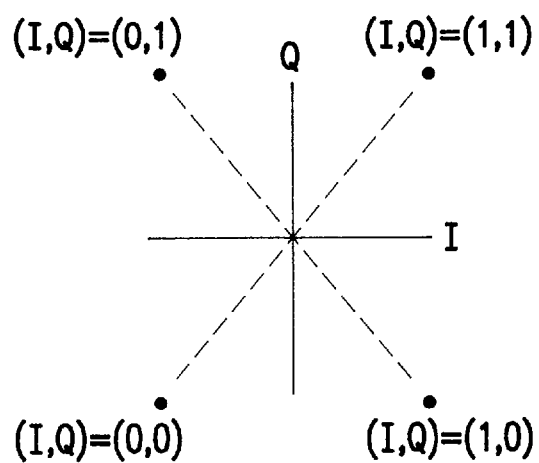
FIG. 5 is a signal layout diagram of a QPSK-modulated signal.
Figure 8:
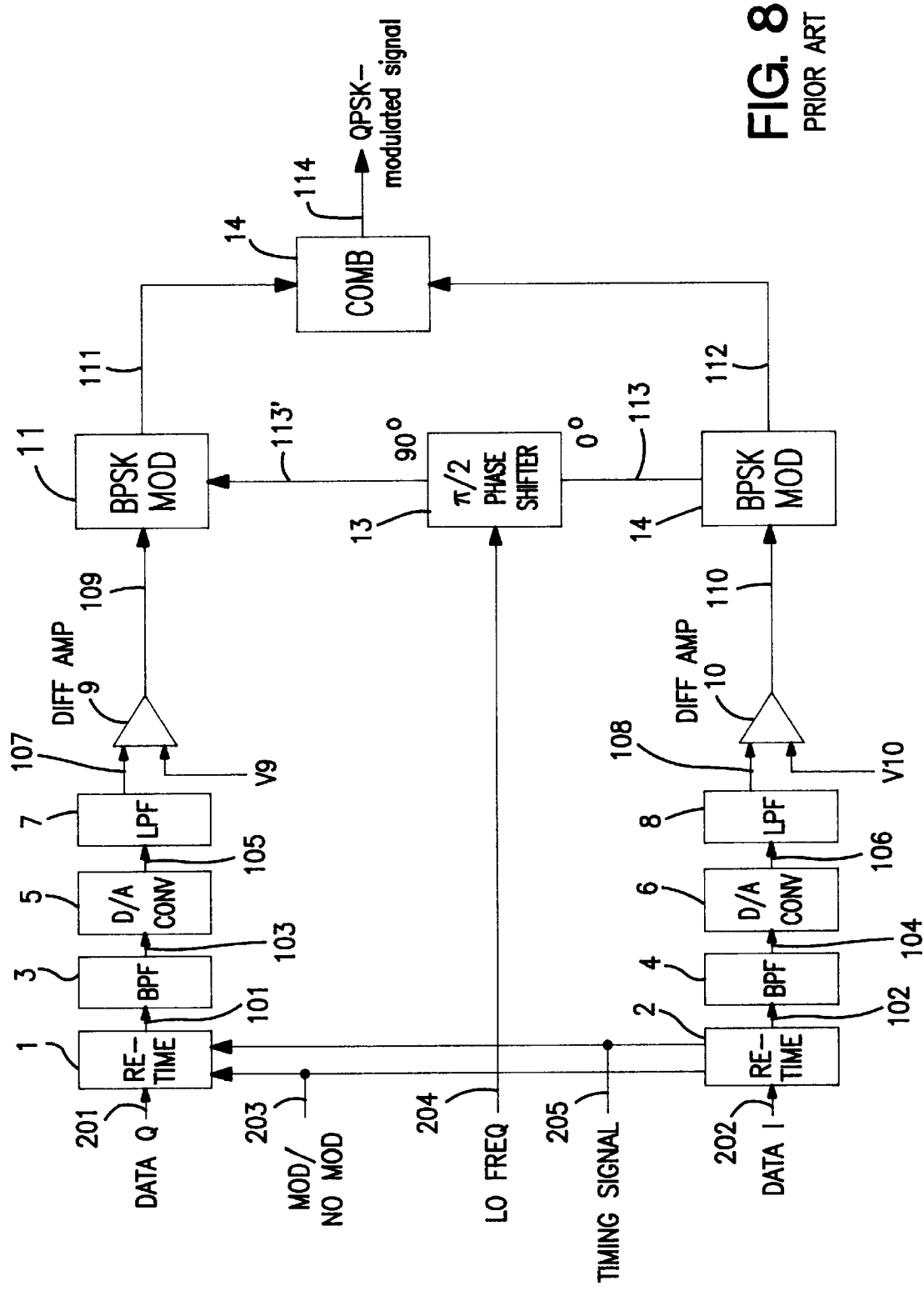
FIG. 8 is a block diagram of a conventional QPSK modulator (prior art).

FIG. 2 is a detailed block diagram of the QPSK modulator (QPSK MOD) 100 shown in FIG. 1. Parts which are the same as those shown in the prior art example of FIG. 8 are indicated by the same reference numerals. Similarly to the prior art, the signal-state space diagram of output signal from the QPSK MOD 100 shown in FIG. 2 is shown in FIG. 5.

The data Q 201 and I 202 for transmission are re-timed by the timing signal 205 in the RE-TIMEs 1 and 2 respectively. Output signals 101 and 102 from the RE-TIMEs 1 and 2 are set to all "1" or all "0" by the MOD/NO MOD 203 during a no-modulation period.

Bandwidths of output signals from the RE-TIMEs 1 and 2 are limited by the BPFs 3 and 4 respectively. Outputs 103 and 104 of the BPFs 3 and 4 are converted into the analog voltage signals 105 and 106 by the D/A CONVs 5 and 6. Sampling signals contained in outputs 105 and 106 from the D/A CONVs 5 and 6 are removed by the LPFs 7 and 8 respectively. As a result, output signals 107 and 108 from the LPFs 7 and 8 are obtained.

Then, the output signals 107 and 108 are applied to the automatic DC offset compensators 301 and 302 which compensate for the DC offset voltage of the differential amplifiers in the automatic DC offset compensators 301 and 302 respectively.

That is, the output signals 107 and 108 are differentiated into control voltages 123 and 124 and amplified by the DIFF AMPs 9 and 10 so that their output signals 109 and 110 are sent to the inputs of the BPSK MODs 11 and 12. Outputs 109 and 110 from DIFF AMPs 9 and 10 are integrated in the integrators (INT) 17 and 18. Outputs 117 and 118 from the INTs 17 and 18 are differentiated into V3 and V4 and amplified in the differential amplifying circuits (DIFF AMP) 31 and 32.

Outputs 131 and 132 from the DIFF AMPs 31 and 32 pass through switches (SW) 27 and 28. Outputs 127 and 128 from the SWs 27 and 28 are added to temperature compensator voltages (a) and (b) in adders (ADD) 23 and 24. As a result, DC offset control signals 123 and 124 for the DIFF AMPs 9 and 10 are obtained. The outputs 109 and 110 are so controlled that they satisfy four signal layouts in the QPSK modulation output and they maintain its characteristics.

Output levels of the outputs 109 and 110 are adjusted by the automatic GAIN offset compensators 303 and 304 respectively. That is, the outputs 109 and 110 are adjusted by variable attenuators (VR ATT) 15 and 16. Outputs 115 and 116 from the VR ATT 15 and 16 are rectified by full-wave rectifiers (RECT) 19 and 20, then integrated by the integrator (INT) 21 and 22. The resulting outputs 121 and 122 are differentiated with reference voltages V7 and V8 and amplified in the DIFF AMPs 33 and 34.

Outputs 133 and 134 from the DIFF AMP 33 and 34 pass through switches (SW) 29 and 30. Outputs 129 and 130 from the SWs 29 and 30 are added to temperature compensator voltages (c) and (d) in adder (ADD) 25 and 26. As a result, attenuator control signals 125 and 126 for the VR ATTs 15 and 16 are obtained. Outputs 15 and 16 from the VR ATTs 15 and 16 are so controlled that they satisfy four signals in the QPSK modulation output and they maintain its characteristics.

FIGS. 6A–6C show exemplary waveshapes of the transmission data. FIG. 6A shows an example of a random transmission data. FIGS. 6B and 6C show examples of the transmission data when a transmission data signal is fixed at all "1" and at all "0".

The outputs 117 and 118, and the full-wave-rectifier outputs 119 and 120, differ according to an input to the INTs 17 and 18 and to the RECTs 19 and 20. That is, such outputs as shown in FIG. 6A when the random transmission data signal is applied to said circuits are different from such outputs as shown in FIG. 6B and 6C, when the transmission data signals are fixed at all "1" or all "0".

In this case, to prevent influences on the DC offset control signals 123 and 124 and the VR control signals 125 and 126 by the difference of such voltage value, each control voltage is respectively changed over by the SWs 27, 28, 29 and 30 according to the MOD/NO MOD 203 to satisfy four signal layouts in the QPSK modulation output. Each control signal is also fixed at constant voltages V1, V2, V5 and V6 so that its characteristics do not change according to the kind of transmission data signal. By so doing, the variation of the characteristics can be prevented by switching over from modulation period to non-modulation period and vice versa. At the same time, four signal layouts in the QPSK modulation output can be satisfied and the difference of the output level can be compensated at that time.

The automatic PHASE offset compensator 305 is described as followed.

To convert one signal 156' obtained by dividing a sinωt signal, namely the LO FREQ 204 by a divider (DIV) 56 into a cosωt signal having a phase differing by π/2 from that of the signal 156, an input is applied to a voltage controlling π/2 phase shifter (π/2 PHASE SHIFTER) 35. A cos(ωt+Δ) signal, namely, an output signal from the π/2 PHASE SHIFTER 35 is multiplied by the sinωt signal, namely, by the signal 156 in multiplier 55. The sin(2ωt+Δ) component of a ½ (sin(2ωt+Δ)+sin(−Δ)) signal, namely, an output signal 155 of the multiplier 55 is removed by the low-pass filter (LPF) 36. As a result, the sin(−Δ) signal, namely, a signal 138 is obtained. This signal is applied to one input terminal of the DIFF AMP 39.

The DIFF AMP 39 amplifies a difference between the signal applied to the other input terminal, namely, the output 138 from the ADD 38 and the signal 136 from the LPF 36, and outputs the resulting voltage as the controlling voltage 139 for the π/2 PHASE SHIFTER 35. The π/2 phase shifter controlling voltage 138 is generated by adding the output voltage 137 from a F-V (frequency-voltage) converting circuit (F-V CONV) 37 to a temperature compensator voltage (e) and the reference voltage V11 in the ADD 38.

This π/2 phase shifter controlling voltage 139 absorbs temperature difference due to the frequency, temperature, etc. of a multiplier 55, etc. The phase shift (the amount of the phase shift) of the π/2 PHASE SHIFTER 35 is controlled by the controlling voltage 139 so that the signal 136 becomes equal to the adder output 138 (so that Δ approaches zero (0)).

Figure 3:
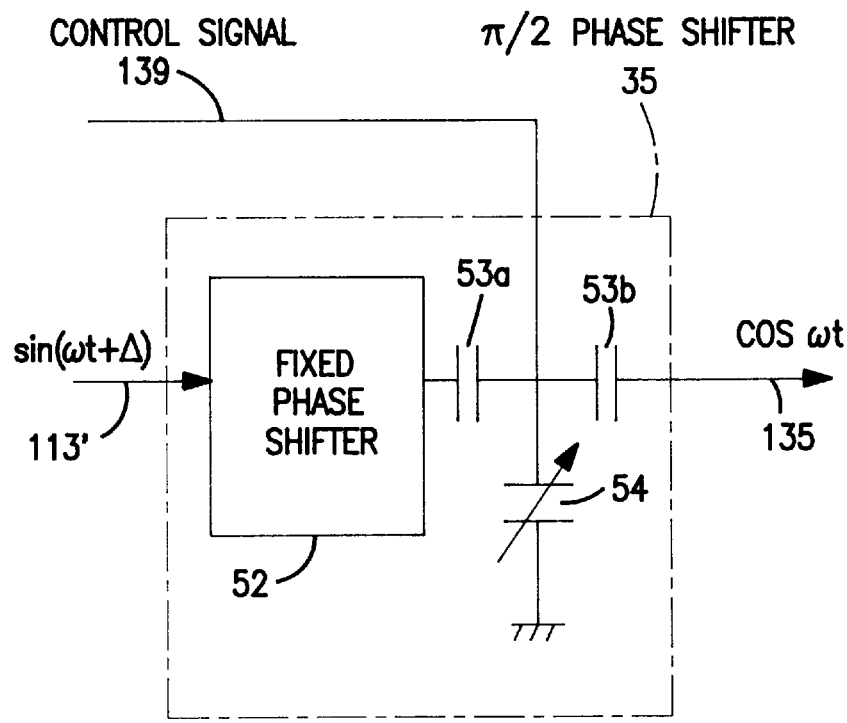
FIG. 3 is a diagram showing an example of the $\pi/2$ PHASE SHIFTER 35 shown in FIG. 2.

FIG. 3 shows an example of the π/2 PHASE SHIFTER 35 using a voltage controlled capacitor. The above-mentioned π/2 PHASE SHIFTER 35 comprises a phase compensator circuit including a fixed phase shifter 52, a voltage controlled capacitor 54, and a capacitor 53 for preventing influences on the signal by the controlling voltage.

The sinωt signal, namely, the signal 113', passes the fixed phase shifter 52, then such signal is converted into a cos(ωt-φ) signal. The resulting signal is phase-shifted to obtain a cosωt signal 135 by the voltage controlled capacitor 54. The control signal 139 controls the voltage controlled capacitor 54 so that the output of such capacitor becomes a cosωt signal.

Figure 4:
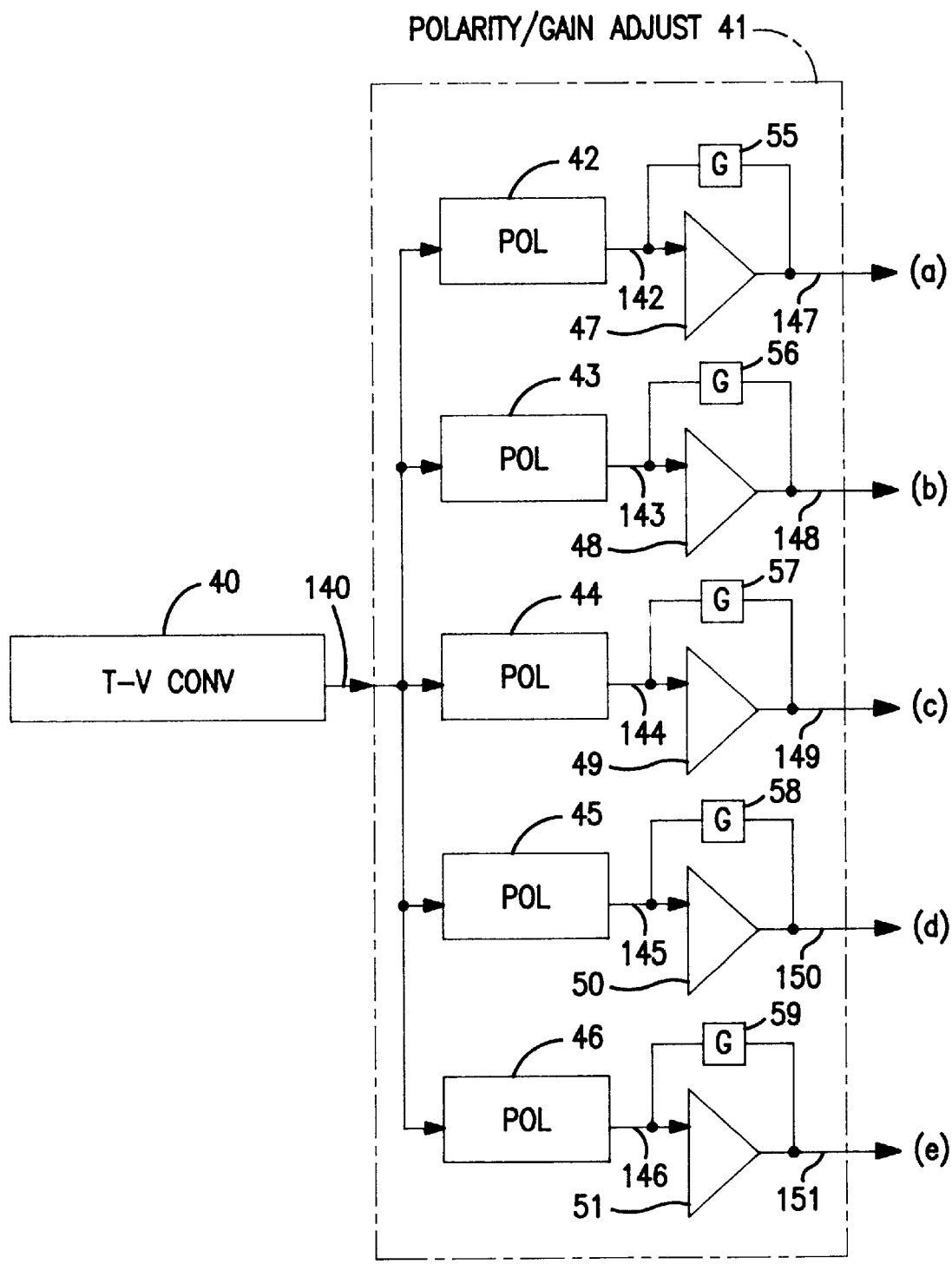
FIG. 4 is a diagram showing an example of a compensation polarity/gain adjusting circuit 41.

A temperature-voltage converting circuit (T-V CONV) 40 detects a temperature change and adjusts its output voltage 140. As shown in FIG. 4, the output of the T-V CONV 140 is applied to compensation polarity/gain adjusting circuit (POLARITY/GAIN ADJUST) 41 and the control polarity of the output of the T-V CONV 140 is respectively determined by polarity determining circuits (POL) 42–46 for the automatic DC offset compensators, the automatic GAIN offset compensators and the automatic PHASE offset compensator. Control ranges of the outputs 142–146 are determined by amplifiers 47–51. As a result, temperature compensator voltages (a)–(e) are obtained. The reference numerals (G) 55–59 show feedback circuits for determining the gain of the amplifiers 47–51.

These circuits are so adjusted that in an initial adjustment stage, four signal layouts in the QPSK modulation output are satisfied by the V3, V4, V7, V8 and V11. After then, such circuits are automatically adjusted so that modulation characteristics can be maintained.

In the above first embodiment, four types of compensators, that is, the automatic DC offset compensator, the automatic GAIN offset compensator, automatic GAIN offset compensator and temperature compensator, are shown to compensate for some offsets of the QPSK-modulation characteristics. However, it is not necessarily required to use all compensators when these offsets are compensated. Any of these compensators may bring good effect in case of compensating for some offsets of the modulation characteristics.

SECOND EMBODIMENT

Figure 7:
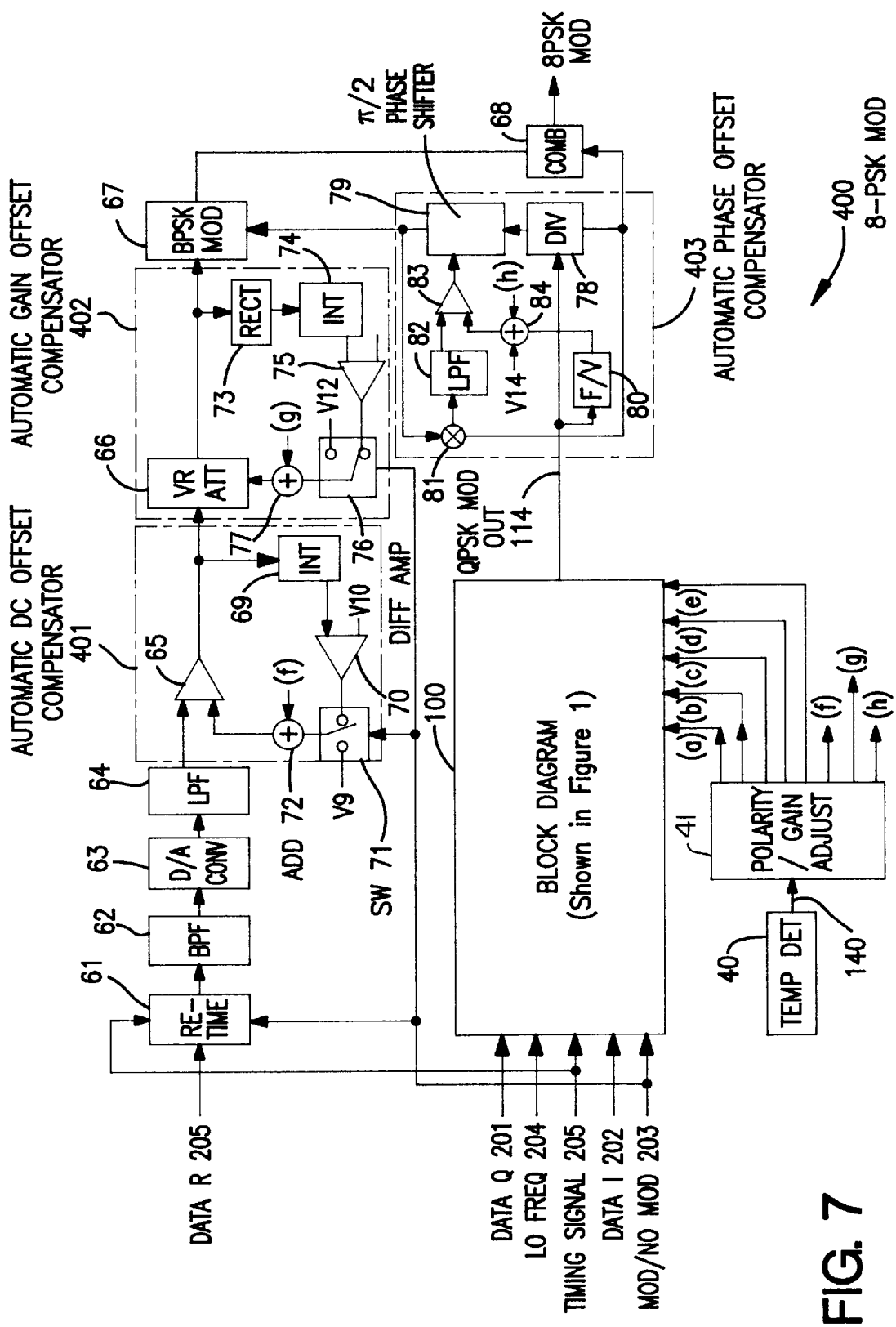
FIG. 7 is a block diagram of another embodiment (8-PSK) of the present invention.

Until now, the present invention has been described with reference to the QPSK-modulation system. It goes without saying that the present invention can be applied to the multi-phase modulation system which modulates n digital data to be transmitted into $2^n$ digital phase modulated signal. FIG. 7 shows a block diagram of the case of n=8. Here, the multi-phase modulator is 8-PSK modulator (8-PSK MOD) 400.

In FIG. 7, an output 114 of the QPSK MOD 100 for the data Q 201 and the data I 202 as shown in FIG. 2 is divided by the divider 78. One of the resulting signals is shifted by 90 degrees in the π/2 phase shifter 79 to obtain one of the inputs for the BPSK MOD 67.

Data R 205 is applied to the other input of said modulator 67. Such data R 205 is applied to the BPSK MOD 67 through the re-timing circuit (RE-TIME) 61, the band-pass filter (BPF) 62, the D/A converter (D/A CONV) 63, the low-pass filter (LPF) 64, the differential amplifier (DIFF AMP) 65 and the variable attenuator (VR ATT) 66.

The following components are used for controlling the offset voltage of the differential amplifier (DIFF AMP) 65: the integrating circuit (INT) 69, the differential amplifying circuit (DIFF AMP) 70, the switch 71, and the adder (ADD) 72. Temperature is compensated by the addition of a temperature compensator voltage (f) in the adder (ADD) 72. The reference voltages V9 and V10 are fixed voltages.

The following components are used for controlling the output amplitude of the variable attenuation amount (VR ATT) 66: the full-wave rectifying circuit (RECT) 73, the integrating circuit (INT) 74, the differential amplifying circuit (DIFF AMP) 75, the switching circuit (SW) 76, and the adder (ADD) 77. Temperature is compensated by the addition of a temperature compensator voltage (g) in the adder (ADD) 77. The reference voltages V12 and V13 are fixed voltage.

The following components are used for controlling the phase error of the voltage controlled π/2 phase shifter 79: the F/V converter (F/V CONV) 80, the multiplier 81, the low-pass filter (LPF) 82, the differential amplifying circuit (DIFF AMP) 83, and the adder (ADD) 84. Temperature is compensated by the addition of a temperature compensator voltage (h) in the adder (ADD) 84. The output of the BPSK MOD 67 is combined with the output from a QPSK MOD 100 which is a divided output from a divider 78 in a COMB 68 and outputted as an 8-phase modulated signal.

Similarly to the temperature compensator signals (a)–(e) shown in FIG. 1, the temperature compensator voltages (signals) (f)–(h) are generated in a compensation polarity/gain adjusting circuit (POLARITY/GAIN ADJUST) 41.

The present invention has an advantage in that the offset of orthogonal adjustment caused by external factors such as the offset changes and the gain changes of the differential amplifiers, the phase offset of the 90-degree shifter, and temperature changes after the initial adjustment of the amplitude-phase characteristics, can be always compensated, and correct signal-state space in the phase modulation output and the orthogonal characteristics can be maintained during the operation of the device. While the present invention has been described in connection with various preferred embodiments thereof, it is to be expressly understood that these embodiments are not to be construed in a limiting sense. Instead, numerous modifications and substitutions of equivalent structure and techniques will be readily apparent to those skilled in this art after reading the present application. All such modifications and substitutions are considered to fall within the true scope and spirit of the appended claims.

What is claimed is:

1. A multi-phase modulator modulating n digital data to be transmitted into a $2^n$ digital phase modulated signal, comprising:

a bandwidth limiting means for limiting the bandwidth of first and second data signal strings respectively;

an analog converting means for converting each resulting signal string into an analog signal string after said bandwidth limitation;

a low-pass filter means for receiving each resulting analog signal string;

a differential amplifying means for setting the amplitude and the offset of each output from said low-pass filter means;

a phase shifting means for generating a pair of carrier signals having a 90-degree phase difference by shifting the phase of a base signal by 90 degrees;

a phase modulating means for phase-modulating each output of said differential amplifying means with a respective one of said pair of carrier signals;

an integrating means for integrating each output of said differential amplifying means;

an offset voltage controlling means for controlling an offset voltage of said differential amplifying means according to a value obtained by adding a signal according to each said integration output to a first temperature compensating signal;

an integrating means for integrating each input of said phase modulating means and providing an integration output;

an amplitude controlling means for controlling the amplitude of the output of said differential amplifying means according to a value obtained by adding a signal according to each said integration output to a second temperature compensating signal;

a multiplying means for multiplying one of said pair of carrier signals by the other;

a means for generating a voltage according to the frequency of said carrier; and a phase controlling means for controlling the phase shift of said phase shifting means according to said generated voltage, the output of said multiplying means and a third temperature compensating signal.

2. The multi-phase modulator according to claim 1, further comprising;

a means for generating a detection voltage according to a detected temperature to generate said first, second and third temperature compensating signals; and means for adjusting polarity and gain to convert said detection voltage into said first, second and third temperature compensating signals.

3. The multi-phase modulator according to claim 1, wherein each of said offset voltage controlling means, said amplitude controlling means and said phase controlling means has a means for fixing an associated controlling voltage at a predetermined specified voltage when each of said offset voltage controlling means, said amplitude controlling means, and said phase controlling means provides an output during a non-modulation period of a retiming circuit operatively connected to each of said offset voltage controlling means, said amplitude controlling means, and said phase controlling means.

4. A multi-phase modulator modulating n digital data to be transmitted into a $2^n$ digital phase modulated signal, comprising:

digital-analog convertors for converting the digital data into analog signals;

automatic gain compensators for controlling output levels of the analog signals, said automatic gain compensators having inputs operatively connected to outputs of said digital-analog convertors;

binary phase modulators for modulating the analog signals, said binary phase modulators having inputs operatively connected to outputs of said automatic gain compensators;

a 90-degree phase shifter operatively connected to said binary phase modulators for providing modulated signals, the modulated signals being phase shifted from one another by 90-degrees; and offset compensators for compensating and adjusting offsets of orthogonal adjustment by automatic control, said offset compensators comprising
DC offset compensators for controlling DC voltages of said digital-analog convertors,
gain offset compensators for controlling gains of said automatic gain compensators, and
a phase offset compensator for controlling phases of the modulated signals provided by said 90-degree phase shifter and input to said binary phase modulators.

5. The multi-phase modulator of claim 4, further comprising:

a temperature compensator operatively connected to each of said DC offset compensators, said gain offset compensators, and said phase offset compensator for compensating effects of temperature.

6. The multi-phase modulator of claim 4, further comprising a modulation/no-modulation switching circuit providing a timing signal to said DC offset compensators and, wherein said DC offset compensators for controlling DC voltages of said digital-analog convertors comprises a switching circuit connected to the timing signal, said switching circuit designed and constructed such that, during a no-modulation signal from the timing signal, a predetermined specified voltage is output from said DC offset compensator.

7. The multi-phase modulator of claim 6, wherein one of said DC offset compensators comprises:

a first differential amplifier having an input connected to an output of one of said digital-analog convertors to accept the analog signals from said one digital-analog convertor; and an offset voltage control circuit accepting an output of said first differential amplifier, and feeding back the accepted output together with a temperature compensating signal as an offset control voltage to said first differential amplifier.

8. The multi-phase modulator of claim 7, wherein said gain offset compensators for controlling gains of said automatic gain compensators each comprise a gain control circuit connected to an output of an associated said first differential amplifier to thereby receive an output signal, wherein said gain control offset compensators control the output signal to a constant output level.

9. The multi-phase modulator of claim 4, wherein said 90-degree phase shifter further comprises a base signal input accepting a base signal and two phase shifted outputs providing a pair of carrier signals having a 90-degree phase difference from one another.

10. The multi-phase modulator of claim 4, wherein said 90-degree phase shifter comprises:

a fixed phase shifter;

a first node of a capacitor connected to an output of said fixed phase shifter; and a voltage-controlled capacitor connected to a second node of said capacitor.

11. The multi-phase modulator of claim 5, wherein said temperature compensator further comprises:

a temperature compensator circuit providing a temperature compensation signal based on a detected temperature; and output nodes connected to said temperature compensator circuit and to each of said DC offset compensators, said gain offset compensators, and said phase offset compensator, wherein each output node provides a different output signal.

12. The multi-phase modulator of claim 11, wherein said temperature compensator further comprises:

a temperature-voltage converting circuit detecting a temperature change and adjusting an output voltage according to the detected temperature change; and a plurality of compensation polarity/gain adjusting circuits, each of the plural compensation polarity/gain adjusting circuits being connected to one of said output nodes, and via said output nodes to one of said DC offset compensators, said gain offset compensators, and said phase offset compensator.

* * * * *